United States Patent [19]

Nolan et al.

[11] Patent Number: 4,488,951

[45] Date of Patent: Dec. 18, 1984

[54] INTEGRATED ELECTROCHEMICAL/CHEMICAL OXYGEN GENERATING SYSTEM

[75] Inventors: Mary E. Nolan, Topsfield; Anthony B. LaConti, Lynnfield, both of Mass.

[73] Assignee: General Electric Company, Wilmington, Mass.

[21] Appl. No.: 549,344

[22] Filed: Nov. 4, 1983

[51] Int. Cl.³ .................. C25B 1/10; C25B 1/30; C25B 9/00
[52] U.S. Cl. .................. 204/129; 204/266; 204/84; 204/282; 204/265; 423/579
[58] Field of Search .......... 204/129, 266, 282–283, 204/84; 423/579

[56] References Cited

U.S. PATENT DOCUMENTS

| | | | |
|---|---|---|---|
| 3,884,836 | 5/1975 | Kühl et al. | 423/579 |
| 3,887,696 | 6/1975 | Bernard et al. | 423/579 |
| 4,061,554 | 12/1977 | Chillier-Duchatel et al. | 204/129 |
| 4,102,757 | 7/1978 | Chillier-Duchatel et al. | 204/129 X |
| 4,416,758 | 11/1983 | Tseung et al. | 204/129 X |

Primary Examiner—Donald R. Valentine
Attorney, Agent, or Firm—I. David Blumenfeld

[57] ABSTRACT

The integrated electrochemical/chemical oxygen generating system of the invention includes a water electrolyzer combined with a chemical oxygen generating subsystem which converts hydrogen from the electrolyzer to a decomposable oxygen source such as hydrogen peroxide. The total oxygen output of such a system is greater than that possible from the electrolyzer alone while safely disposing of the electrochemically generated hydrogen.

13 Claims, 3 Drawing Figures

INTEGRATED ELECTROCHEMICAL/CHEMICAL OXYGEN GENERATING SYSTEM

This invention relates to an oxygen generating system. More particularly, it relates to a hybrid system which includes electrolytically generated oxygen and also oxygen generated from hydrogen peroxide formed by chemically reacting hydrogen from the electrolyzer.

Electrolysis of water is a well known process for the production of oxygen. One particularly advantageous form of a water electrolyzer is described in U.S. Pat. Nos. 3,992,271, and 4,039,409 assigned to General Electric Company, the assignee of the present application. The water electrolyzer described in these patents consists of one or more cells each of which includes a cation exchanging membrane that separates the cell into anode and cathode chambers. Catalytic anode and cathode electrodes are positioned in intimate contact with opposite surfaces of the membrane, with the preferred form of intimate contact being bonding of the catalyst to the membrane. Water is electrolyzed in the anode chamber to produce oxygen. Hydrogen ions produced in the anode reaction are transported through the membrane to form gaseous hydrogen in the cathode chamber.

Membrane electrolyzers of this type are particularly useful because they do not require liquid electrolytes and because they can be operated at high current densities, (densities ranging from 200–2000 amp/ft.$^2$ are common) so that a relatively small and compact assembly can produce a substantial volume of oxygen.

However, where the electrolytically generated oxygen is to be used in medical, home or similar applications, disposing of the hydrogen can be a problem and can limit the applicability and use of electrolytic oxygen generators.

Applicant has found a simple and effective solution to the problem of safely disposing of the gaseous hydrogen from the electrolyzer while simultaneously increasing the total oxygen output of the system. To this end, a portion of the electrolytic hydrogen is used to extract oxygen from an air stream by catalytic conversion of hydrogen and oxygen to hydrogen peroxide with the remaining hydrogen being converted to water. The hydrogen peroxide is decomposed catalytically to produce oxygen and water and the oxygen is used to enrich the oxygen stream exiting from the anode chamber of the electrolyzer thus producing more oxygen than is possible with the electrolyzer alone. In this fashion all of the hydrogen produced by the electrolyzer cell is safely disposed of and used to produce extra oxygen by chemical conversion processes.

It is, therefore, a principal objective of this invention to produce an electrolytic oxygen generator in which the gaseous non-oxygen product is used to produce additional oxygen.

A further objective of the invention is to provide a water electrolyzer for providing oxygen in which the by-product hydrogen gas is safely disposed of.

Still another objective of the invention is to produce an oxygen generating system in which the chemical conversion and reconversion of the gaseous hydrogen from an electrolyzer is utilized to extract oxygen from an air stream and to increase the oxygen output of the system.

Other objectives and advantages of the invention will become apparent as the description thereof proceeds.

The various objectives and advantages of the invention are realized in an oxygen generating system which includes one or more membrane electrolyzer cells in which water is electrolyzed to produce oxygen in the anode chamber and hydrogen in the cathode chamber. Hydrogen from the cathode chamber is combined with an air stream and introduced into a catalytic reaction zone where a portion of the hydrogen is chemically combined with oxygen in the air stream to form an oxygen source such as hydrogen peroxide. The remaining portion of the hydrogen is converted to water. The hydrogen peroxide is introduced into a catalytic decomposition zone where it is catalytically decomposed to form oxygen and water. The total oxygen output of the system is thus greater than the output from the electrolyzer alone while safely and readily disposing of the electrolytic hydrogen.

The novel features which are believed to be characteristic of the invention are set forth with particularity in the appended claims. The invention itself, however, together with further advantages thereof may best be understood by reference to the following description taken in connection with the accompanying drawing in which:

Figure 1:
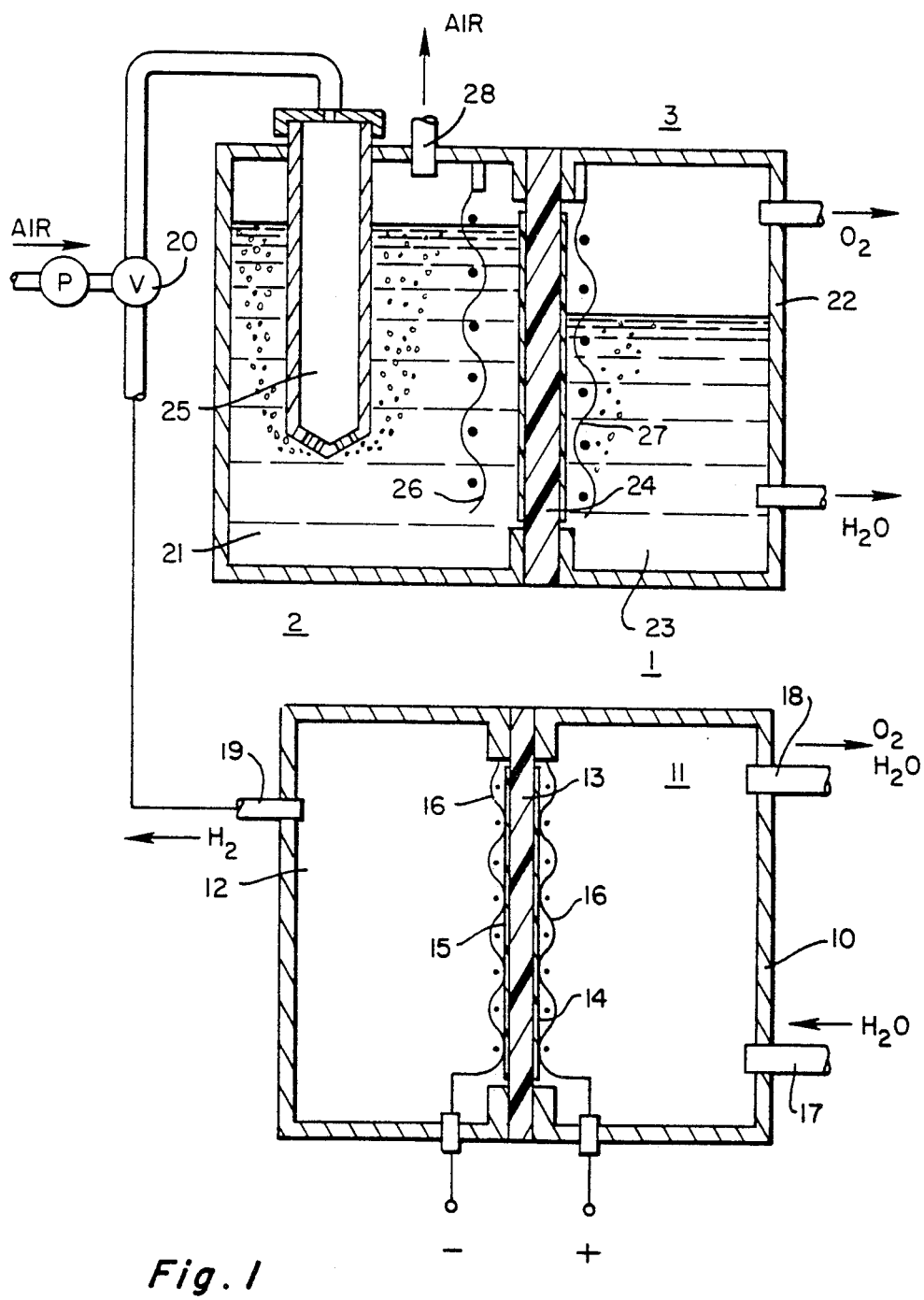
FIG. 1 is a schematic illustration of a membrane water electrolysis cell coupled with a chemical converter for chemically disposing of the hydrogen and producing additional oxygen by chemical extraction of oxygen from an air stream.

FIG. 1 illustrates the integrated electrochemical/chemical oxygen generating system of the instant invention. The oxygen generating system includes an electrolyzer 1 comprising one or more cells for electrochemically dissociating water to produce oxygen and hydrogen although only one cell is shown for the sake of simplicity and ease of explanation. Coupled to electrolyzer 1 is reactor 2 for disposing of the hydrogen by converting it to hydrogen peroxide and water. Hydrogen peroxide formed in reactor 2 is fed to catalytic decomposer 3 to produce oxygen and water, with the oxygen being combined with the output of the electrolyzer to enrich the oxygen output of the system.

Water electrolyzer cell 1 consists of a housing 10 which may be fabricated of any material (such as stainless steel) which is resistant to the oxygen and hydrogen products from the electrolyzer. Housing 10 is divided into anode and cathode chambers 11 and 12 by means of a permselective (i.e., cation exchanging) polymeric membrane 13. Anode and cathode electrodes 14 and 15 are positioned in intimate contact with opposite sides of membrane 13 and are preferably bonded directly thereto.

The anode and cathode electrodes are preferably in the form of bonded aggregates of catalytic particles and a polymeric binder such as polytetrafluorethylene (PTFE). The catalytic particles on the anode side may be platinum-iridium oxides, platinum-ruthenium oxides, ruthenium-iridium oxides, ruthenium iridium tantalum oxides or other stable low over-voltage noble metal oxides. The cathode catalytic particles are preferably platinum black, palladium black, ruthenium black, reduced ruthenium iridium oxides used alone, as mixtures or with an extender such as graphite. It is to be understood that there are a variety of catalytic anode and cathode particles which may be utilized in addition to those specifically described herein.

Current collecting screens 16 of titanium niobium, or the like, are positioned against the anode and cathode electrodes and are respectively connected to the positive and negative terminals of a DC power source. An inlet conduit 17 is provided to introduce water to the anode chamber and oxygen and excess water are removed from the chamber by outlet conduit 18. Hydrogen from cathode outlet conduit 19 is combined with an oxygen bearing gaseous stream, (preferably air) in a mixing chamber or mixing valve 20 so that the hydrogen/oxygen mixture can be readily controlled. Preferably, the hydrogen is diluted with the air to form a mixture which does not exceed four (4) volume percent of hydrogen in air. The hydrogen-air mixture is introduced into reactor 21 to form hydrogen peroxide. Both the reactor and decomposition zones are located in a housing 22 which is separated into reaction and decomposition chambers 21 and 23 by a semi-permeable membrane 24 which has significant water, peroxide transport.

The hydrogen-air mixture is introduced into chamber 21 which constitutes the first reaction zone by means of a perforated tube 25 which extends into an aqueous electrolyte solution such as 0.01N sulfuric acid contained in chamber 21. The mixture is bubbled through the solution and contacts a catalytic reaction element 26 which is shown in FIG. 1 as a woven platinum screen. A portion of the hydrogen and oxygen from the air is reacted on the screen to form hydrogen peroxide with substantially all of the remaining hydrogen reacting to form water. Excess air and any residual hydrogen is removed from the reactor by an outlet conduit 28.

Decomposition of the peroxide to produce oxygen and water takes place in the second or decomposition chamber which constitutes the second or decomposition reaction zone although, as will be pointed out subsequently, the catalytic decomposer may be separate from the reactor. Membrane 24 which separates the housing into the two reaction zones or chambers is a semi-permeable membrane, such as Nafion 117, porous polyethylene, so that the hydrogen peroxide, which is very similar to water, is readily transported across the membrane. In a system where a liquid electrolyte such as aqueous sulfuric acid is utilized in the reactor, the water permeable membrane is preferably a cation exchanging membrane such as Nafion 117 which is permeable to water and hydrogen peroxide but will be impermeable to sulfate ions so that the sulfuric acid does not diffuse to the decomposition chamber.

Alternatively, if a solid electrolyte is utilized in the reactor, the membrane may be microporous, i.e., a polymeric material having either labyrinthine pores or pores of a non winding character. One microporous membrane of approximately 7 mil thickness is commercially available from the DuPont Company under its tradename Nafion 701 and includes randomly distributed labyrinthine micropores which are generally rectangular in shape and extend through the membrane. Pore dimensions in Nafion 701, as measured by pressure drop or mercury intrusion techniques, are as follows:
1. Cross sectional area—one micron by 10 microns.
2. Individual interconnectional lengths to form the labyrinthine pores extending through the membrane—approximately 3–30 microns.
3. Void volume—40–50%
4. Air flow through the diaphragm—from 0.02–0.06 SCFM/in$^2$ of membrane at 20 cm mercury vacuum.

Catalytic reaction element 27 in FIG. 1 is shown as a woven platinum screen. However, the catalytic reaction element is not limited to screens nor to platinum catalysts. Other noble metal (high surface area) blacks may be used, as may be transition metals, silver, carbon, graphite, oxides of the metals, as well as carbides, silicides and nitrides of these metals. Alternatively, organic catalysts such as pthalocyamines or anthraquinones may be utilized to produce the hydrogen consuming, peroxide forming reaction. Furthermore, these catalysts may be deposited on substrates of various sorts rather than being deposited on a screen.

A catalytic decomposition element 27 is located in chamber 24 and decomposes the hydrogen peroxide to form oxygen and water. It is shown as a screen having decomposition catalysts deposited thereon. The decomposition catalysts which may be used include:

Raney nickel, $MnO_2$, noble metal blacks, silver, Co compounds, metallized graphite, metal carbides ($BC_4$; $WC_2$, etc.) silicides and borides.

The catalyst, in the reactor and decomposer, may be supported on screens and various kinds of substrates, porous diaphragms, porous papers and the like.

Figure 2:
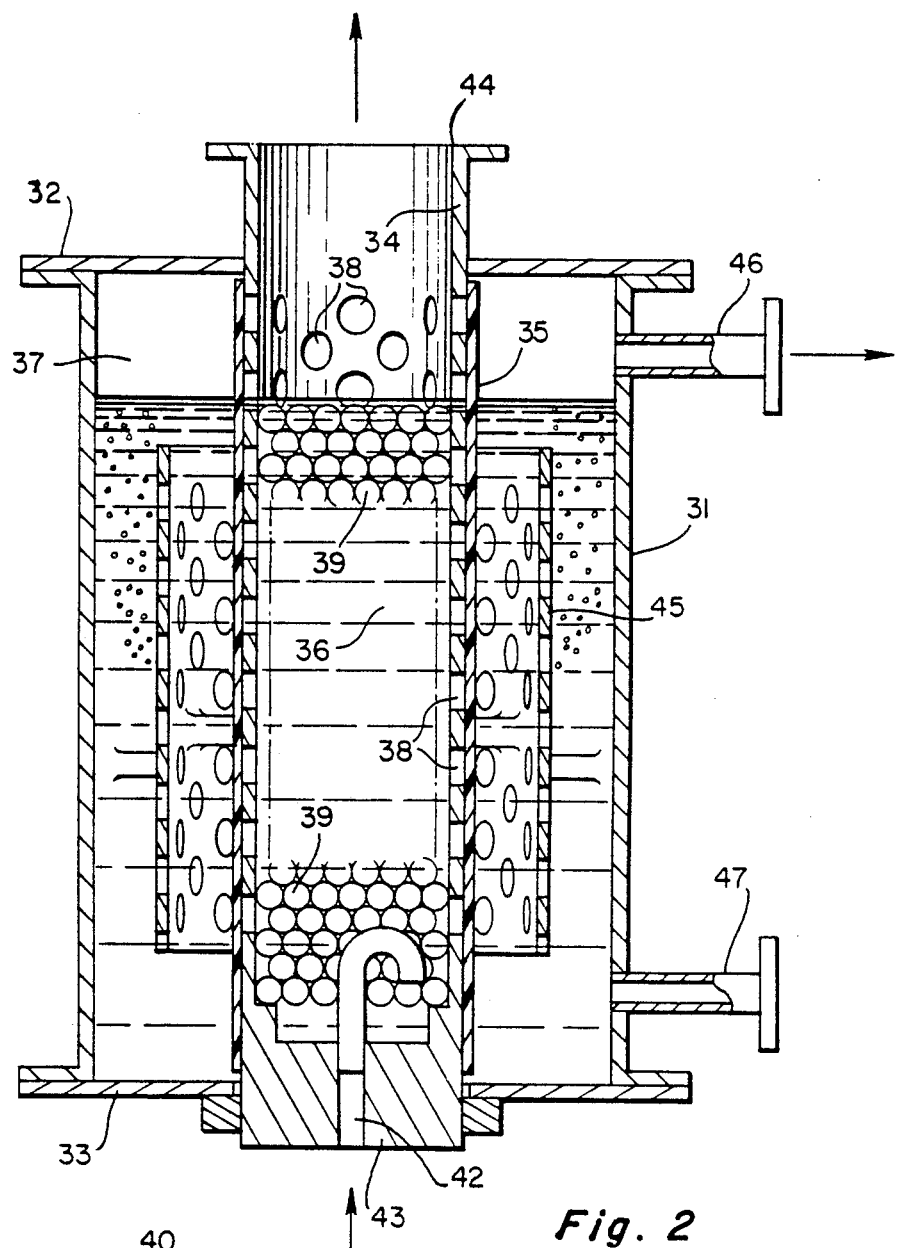
FIG. 2 illustrates a peroxide reactor/decomposer structure useful in the integrated oxygen generator of FIG. 1.

An electrolyte (acidic or caustic) either in liquid form as shown in FIG. 1 or in solid form, as will be described in connection with FIG. 2, is needed to cause the hydrogen peroxide reaction to proceed properly. The preferred reactor design is one which does not contain liquid electrolytes but rather is one in which the electrolyte is a solid having the catalyst deposited thereon. One example of a solid electrolyte, which will be described in detailed subsequently, is ion-exchange beads having a catalyst layer deposited within and on the surface. Metallized cation exchange beads can be prepared by exchanging positive ions such as $Cu^{++}$, $Ni^{++}$, $Ag^+$, $Pd^{++}$ and complex positive ions such as Pt diaminodinitrito ions, copper ammonium ions, etc. into the beads and subsequently reducing these metallic ions to the metallic state with suitable reducing agents such as sodium borohydride, hydrazine and the like. Metallized anion exchange beads can be prepared by exchanging negative ions such as chloroplatinate, $PtCl_6=$, ion, etc. into anion exchangers and subsequently reducing these complex ions to the metallic state with suitable reducing agents such as listed above.

EXAMPLE

An integrated electrochemical/chemical oxygen generating system of the type just described was tested and evaluated. An electrochemical water electrolyzer was constructed consisting of three series-connected bipolar cells, each having an active cell area of approximately 0.05 ft$^2$. Each cell was divided into anode and cathode chambers by means of a cation transporting membrane of the type sold commercially by the DuPont Company under its trade designation Nafion 120 which is an 120 equivalent weight membrane, having sulfonic acid functional groups and is approximately 10 mils in thickness. The anode electrode was a bonded aggregate of 50 weight percent platinum iridium oxide and polytetrafluorethylene polymeric binder particles. The cathode electrode was an aggregate of platinum black and similar binder particles.

The individual series-connected cells were separated by 10 mil titanium bipolar elements which contacted the current collectors associated with the anodes and cathodes of adjacent cells. The current collecting screens which are directly connected to the positive and negative terminals of the DC power source were 003 gauge platinized titanium screens.

The electrolyzer was operated at a current of 10 amps (current density 200 A/ft$^2$) and yielded approximately 225 cm$^3$ of hydrogen and 113 cm$^3$ of oxygen per minute. The electrochemically generated hydrogen was diluted with air to form a two (2) volume percent (%) hydrogen in air mixture. The mixture was bubbled through a reactor containing a catalytic conversion element in the form of a woven platinum screen (100 mesh) having a dimension of 7.75 in. (W) by 5.75 in. (L)×0.01 in (T). The catalytic screen was immersed in a 100 ml solution of 0.01N sulfuric acid. A small quantity of a Ti$^{++++}$ solution was added to the acid electrolyte to serve as a visual indicator for the production of hydrogen peroxide from the catalytic reaction of the electrochemically generated hydrogen and air mixture on the platinum screen. The mixture was bubbled through the dilute acid solution with the Ti$^{++++}$ indicator for 24 hours and the quantity of peroxide formed was measured using spectrophotometric techniques. It was found that approximately 0.03% of the electrochemically generated hydrogen was converted to peroxide with the remainder going to water or remaining unreacted. A portion of the peroxide solution was then transmitted to a decomposition chamber containing a platinum black catalyst deposit on a graphite substrate and the hydrogen peroxide was readily decomposed to water and oxygen in the catalytic decomposer.

FIG. 2 illustrates an integral reactor-decomposer structure which is characterized by the use of catalyzed ion exchanging beads as the electrolyte. The reactor is separated from the decomposer by means of a water permeable membrane which permits the peroxide to diffuse into the decomposer reaction zone or chamber. The reactor/decomposition structure of FIG. 2 includes a tubular housing 31 which is closed at the top and bottom by means of the upper and lower cover plates 32 and 33. Extending through the center of the housing is a perforated, tubular member 34 which supports a tubular water and hydrogen peroxide permeable membrane separator 35. The tubular membrane support 45 and the membrane divide the housing into two concentric chambers, one being the inner reactor chamber 36 and the other being the outer or decomposition chamber 37.

Figure 3:
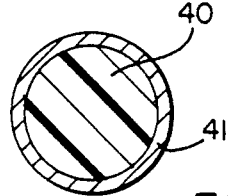
FIG. 3 illustrates the catalyzed ion exchange beads used in the reactor of FIG. 2.

The walls of the tubular membrane support 34 are provided with holes or perforations 38 which begin a short distance below cover 32 and extend to the bottom of the support member. Positioned in reactor chamber 36 are a plurality of catalyzed ion-exchange beads 39 which are immersed in distilled water. The catalyzed ion-exchange beads, as may be seen most clearly in FIG. 3, consist of polymeric ion exchange beads 40 of the type sold by Illinois Water Treatment under the designation TC-2, covered by a thin catalytic surface layer 41 which is deposited on the ion exchanging beads in the manner previously described.

The hydrogen air mixture is brought into the reactor chamber and into contact with the catalytic beads by means of a gas mixture inlet tube 42 which extends through a closure plug 43 which extends through bottom plate 33. The hydrogen air mixture in passing upwardly through the bed of catalyzed ion exchange beads reacts to form hydrogen peroxide and water with any excess air or any residual hydrogen being removed from the reactor chamber through the outlet conduit 44. The hydrogen peroxide formed in the reactor chamber passes through the perforations in tubular membrane support member 34 and into contact with the interior side of the separator membrane 35. Because the reactor chamber contains no liquid electrolyte (only distilled water), the membrane characteristics are much less complex. The membrane need only be water and H$_2$O$_2$ permeable since it does not have to have electrolyte rejection characteristics. Hence, porous membrane structures such as polyethylene, polypropylene, etc. can be used in place of expensive ion exchanging membranes.

A perforated decomposition catalyst support membrane 45 is positioned in decomposition chamber 37 and attached to the semi-permeable membrane or the walls of the housing by means of a plurality of radially extending vanes. Support element 45 has catalytic material deposited on the surfaces thereof whereby hydrogen peroxide permeating through membrane 35 is decomposed into oxygen and water. The oxygen permeates upward through the distilled water in the decomposition chamber and is removed from the decomposition chamber through the decomposer outlet conduit 46 while the distilled water in the decomposer may be removed through a decomposer water outlet conduit 47. The oxygen from the decomposer, as pointed out previously, is combined with the oxygen from the water electrolyzer to provide additional oxygen, i.e., the oxygen outlet from the electrolyzer is enriched by the amount of oxygen extracted chemically from the air stream by hydrogen from the electrolyzer. More importantly, however, by means of these structures and the overall arrangement the electrolytic hydrogen is safely and efficiently disposed of thus opening up applications for the use of electrolytic oxygen producing systems where the disposal of the electrolytic hydrogen can present a problem.

While the instant invention has been shown and illustrated by means of certain preferred embodiments thereof, the invention is by no means limited thereto since other modifications of the instrumentalities and of the steps of the process may be made and still fall within the scope of the invention. It is contemplated by the appended claims to cover any such modifications that fall within the true scope and spirit of the invention.

What is claimed as new and desired to be secured by Letters Patent of the United States is:

1. A process for generating oxygen including the steps of:
   (a) electrolyzing water to produce oxygen in the anode chamber of a cell divided into anode and cathode chambers by a cation transporting membrane;
   (b) forming gaseous hydrogen by reduction of hydrogen ions in the cathode chamber of the cell;
   (c) removing the hydrogen from the cathode chamber;
   (d) providing an oxygen containing gaseous stream;
   (e) chemically converting the electrolytically produced hydrogen with oxygen from the said oxygen containing gaseous stream to form hydrogen peroxide;
   (f) chemically decomposing the hydrogen peroxide to form oxygen and water;
   (g) recovering both the electrochemically produced oxygen and the chemically produced oxygen as product whereby the electrochemically produced hydrogen is safely disposed of and additional oxygen is produced by chemical extraction thereof from an oxygen containing gas stream.

2. The process according to claim 1 wherein the electrochemical reactions in the anode and cathode chamber take place at electrodes which are in intimate contact with the membrane.

3. The process according to claim 1 wherein the oxygen containing stream is air.

4. The process according to claim 1 wherein hydrogen and the oxygen containing gas stream are brought into contact with a catalyst to form hydrogen peroxide.

5. The process according to claim 1 wherein hydrogen and the oxygen containing stream are exposed to a catalyst in the presence of an electrolyte.

6. The process according to claim 5 wherein the electrolyte is an aqueous electrolyte.

7. The process according to claim 5 wherein the electrolyte is a solid and is in contact with said catalyst.

8. A process for generating oxygen comprising:
 (a) electrochemically forming gaseous oxygen from water by oxidation at an anode electrode in a membrane cell and forming gaseous hydrogen by reduction at the cathode electrode of said cell,
 (b) chemically disposing of the hydrogen gas by extraction of oxygen from an air stream including:
  1. chemically combining at least a portion of said hydrogen with oxygen from said gas stream through a catalytic reaction in a first reaction zone to form hydrogen peroxide,
  2. chemically combining the remainder of said hydrogen with oxygen from said gas stream to form water,
 (c) catalytically decomposing the hydrogen peroxide to form oxygen and water in a second reaction zone,
 (d) enriching the electrochemically produced oxygen with the chemically produced oxygen.

9. The process according to claim 8 wherein the membrane cell is divided into anode and cathode chambers by means of a gas and liquid impermeable cation exchange membrane.

10. The process according to claim 8 wherein the hydrogen peroxide is removed from the first reaction zone by permeation through a water permeable membrane.

11. The process according to claim 8 wherein hydrogen and the oxygen bearing stream are simultaneously introduced into said first reaction zone.

12. An oxygen generating system comprising:
 (a) a water electrolysis cell comprising:
  (1) a housing,
  (2) a cation transporting membrane dividing said cell into anode and cathode chambers,
  (3) anode and cathode electrodes in intimate contact with opposite sides of said membrane,
  (4) inlet means for introducing water into said anode chamber and outlet means for removing gaseous oxygen,
  (5) means for removing gaseous hydrogen from said cathode chamber,
 (b) chemical conversion means coupled to the cathode chamber for disposing of the gaseous hydrogen and extracting oxygen from an air stream, including:
  (1) a first catalytic reaction zone for converting a portion of the gaseous hydrogen and oxygen from air stream to hydrogen peroxide, said catalytic reaction zone containing catalytic means and electrolyte means in contact with said catalytic means,
  (2) a second catalytic reaction zone downstream from said first zone for converting the remaining gaseous hydrogen and oxygen from the air stream to water,
  (3) means for removing hydrogen peroxide from said reaction zone including membrane means permeable to water and hydrogen peroxide
 (c) a catalytic decomposer coupled to said converter for decomposing the hydrogen peroxide to gaseous oxygen and water,
 (d) means for combining the electrochemical and chemically produced oxygen.

13. The oxygen generating system according to claim 12 wherein said anode and cathode electrodes are bonded to opposite sides of said membrane.

* * * * *